(12) United States Patent
Farinella

(10) Patent No.: US 6,361,052 B1
(45) Date of Patent: Mar. 26, 2002

(54) SEAL FOR PREVENTING LEAKAGE OF FLUIDS BETWEEN IRREGULAR AREAS ON MATING SURFACES

(75) Inventor: Andrew Farinella, Oradell, NJ (US)

(73) Assignee: Seals Eastern, Inc., Red Bank, NJ (US)

( * ) Notice: Subject to any disclaimer, the term of this patent is extended or adjusted under 35 U.S.C. 154(b) by 0 days.

(21) Appl. No.: 09/571,219

(22) Filed: May 16, 2000

(51) Int. Cl.⁷ .................................................. F16L 17/06
(52) U.S. Cl. ........................ 277/611; 277/616; 277/626; 277/644
(58) Field of Search .................................. 277/608, 609, 277/611, 616, 626, 627, 637, 639, 641, 644

(56) References Cited

U.S. PATENT DOCUMENTS 3,166,332 A  *  1/1965  Olson .......................... 277/644
4,368,894 A  *  1/1983  Parmann .................. 277/627 X
5,074,711 A  * 12/1991  Glang et al. ............. 277/626 X
5,228,702 A  *  7/1993  Browne et al. ............. 277/608

* cited by examiner

Primary Examiner—Robert J. Sandy
Assistant Examiner—Karlena D. Schwing
(74) Attorney, Agent, or Firm—Levine & Mandelbaum

(57) ABSTRACT

A seal for preventing the flow of fluid under high pressure, between a carrier and a mating element adapted to engage the carrier is provided by a resilient elastomeric sealing element which is disposed in an arcuate groove in the carrier and deformed when the carrier is joined to the mating element. The sealing element has a base with oppositely extending wings and a head with a convex surface that is engaged by the mating element for deflecting the head within the groove.

13 Claims, 2 Drawing Sheets

SEAL FOR PREVENTING LEAKAGE OF FLUIDS BETWEEN IRREGULAR AREAS ON MATING SURFACES

BACKGROUND OF THE INVENTION

It is known in the art to contain fluids under high pressure in conduits and vessels formed by mating two or more parts or to prevent such fluids from entering the conduits or vessels from outside. It is further known that in order to prevent leakage of such fluid at the mating surfaces of the parts, a deformable sealing element made of an elastomeric material can be provided to fill the space through which leakage might otherwise occur.

Deformable sealing elements, when subjected to high pressure differentials, tend to extrude through a clearance between the mating surfaces thereby compromising the integrity of the seal. Prior art solutions for the problem of seal extrusion have included the use of additional sealing components in the form of back-up washers. O-ring's have also been disposed in close-tolerance rectangular grooves to alleviate the problem of seal extrusion.

In addition to O-rings, prior art designs utilized in sealing applications have included lip seals and gaskets. However, all of these approaches have shortcomings. An O-ring profile, although simple and versatile, is impractical for sealing extensive irregular areas. The preparation of an O-ring that will remain in place when subjected to large pressure differentials is difficult as is its installation which is likely to be done incorrectly. Moreover, a close-tolerance rectangular groove is difficult to maintain, requires large amounts of space in the carrier, and concentrates stresses at corners of the groove. An O-ring seal will be subject to extrusion where an excessive gap exists between mating surfaces.

A sometimes more effective solution than those discussed above is sometimes provided by a lip seal profile. A lip seal profile, i.e., one which employs a flap, is capable of developing good contact under stress when mechanically loaded. However, a lip seal is also not without substantial limitations.

A lip seal becomes energized by the fluid pressure it is designed to contain rather than by mechanical loading. As the fluid pressure increases, a greater force is applied from within the hollow of the lip-seal against its flaps thereby increasing the seal's contact stress. As the fluid pressure increases so does the contact stress.

A lip seal is limited to effective sealing in only one direction. Additionally, the manufacture of lip seal elements which require molding of "flap" geometry undercuts to suit each specific application can be costly. Furthermore, a lip seal can be damaged if a small portion is mechanically loaded, for a period of time, prior to its installation in its intended environment. Such damage typically occurs during manufacturing, shipping, and/or storage.

Gaskets, as well as other designs known to the art, are susceptible to damage by excessive mechanical loading. The polymeric material of a such a seal is typically incompressible. If the seal is subjected to excessive compressive forces in the application, the seal is likely to mechanically fracture since it is forced to extrude under the compressive load. Such damage often occurs during installation in the application.

Finally, in the presence of a pressure differential, prior art profiles are subject to continuous and/or intermittent strain relaxation, ("creep", "extrusion") in the absence of back-up washers or a close tolerance groove to provide lateral restraint to the sealing element. However, the use of a back-up washer introduces an additional component with its attendant cost and the increased complexity of the interaction between the sealing element and washer. A rectangular groove, normally required to support a back-up structure, does not fully protect the seal from extrusion. Irregularities in the clearance between the mating surface and groove present areas where the seal can extrude. Gaskets by their design are laterally unrestrained seal systems and subject to creep.

SUMMARY OF THE INVENTION

The aforesaid problems of the prior art are overcome by the present invention which provides for a novel sealing element and its use to prevent the flow of fluid under high pressure differentials between the mating surfaces by providing a sealing element formed from a resilient polymeric material. The sealing element has a head with a cross section of generally semicircular circumference and a base to which the head is integrally connected. The base has integral wings extending outwardly in mutually opposite directions. The head of the sealing element is deformed by mechanical pressure applied against it by the mating element thereby increasing its contact surface area with the mating element for preventing passage of fluid between the sealing element and the mating surface. Pressure exerted by the fluid urges the deformed head against the wings for preventing passage of fluid between the sealing element and the carrier.

Fluid is prevented from traversing an interface between a surface of the carrier element and a surface of a the mating element by forming a concave groove in the carrier element, inserting within said groove, an elastomeric sealing element as described above, and placing the mating element surface in engagement with the carrier surface and with the convex outer surface of the head of the sealing element whereby said sealing element is deformed to assume a profile which presents an impenetrable barrier to the flow of fluid.

An object of the invention is to isolate or seal extensive irregular areas between two stationary mating surfaces as well as between symmetrical areas of mating surfaces.

Another object of the invention is to contain fluids, i.e., gas or liquids, within a vessel or conduit or exclude them from a vessel or conduit in the presence of a large pressure differential between the interior and exterior of the vessel or conduit.

Still another object of the invention is to effect a seal between surfaces having available areas which are very small.

DESCRIPTION OF THE PREFERRED EMBODIMENTS

Figure 1:
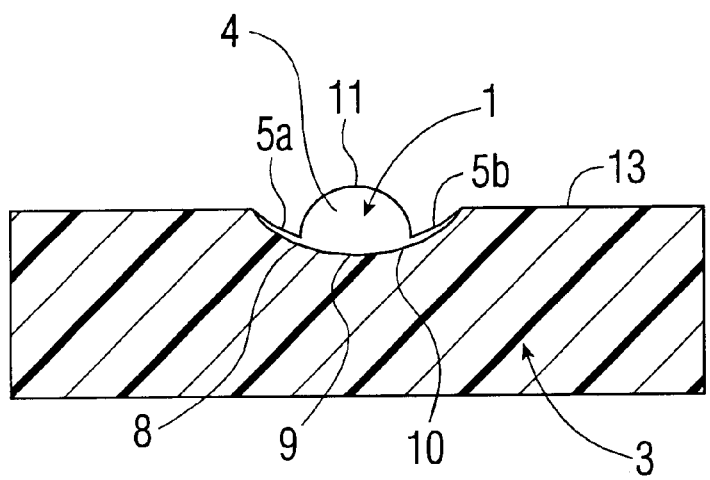
FIG. 1 is a sectional elevation view of a sealing element with a carrier containing a polymeric component.
Figure 2:
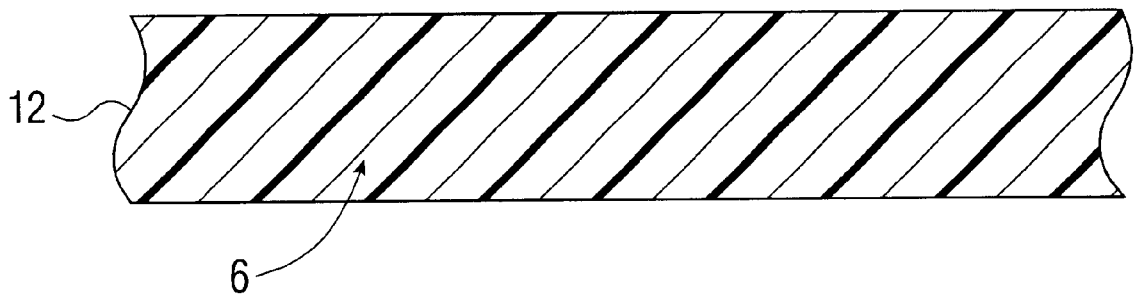
FIG. 2 is a sectional elevation view of a mating element having a mating surface intended to be engaged by the sealing element of FIG. 1.

Referring now to FIGS. 1 and 2 of the drawings, the seal of the invention includes a closed loop sealing element 1 formed from an elastomeric polymer and having a uniform cross section throughout its length. Virtually any polymeric material resistant to compressive stress relaxation is suitable for use in the sealing element 1.

The cross section of the sealing element 1 has a profile with a head 4, which is generally semicircular in an unstressed condition, integral with a base 10 from which two integral wings 5a and 5b extend outwardly in mutually opposite directions.

Each of the wings has a profile narrower at a free end distal from the head 4 than at an opposite end proximate a juncture between the head 4 and the base 10. The cross sectional profile of each wing initially widens with distance from the juncture between the head 4 and the base 10 toward an intermediate region of maximum thickness and then tapers inwardly, becoming progressively thinner with distance from the region of maximum thickness to its free edge.

A seal is effected when a seal carrier 3, having a groove containing the sealing element 1 is urged against a surface 6 of a mating element.

The seal carrier 3 has a generally circular grove 8, i.e., concave in cross section, with a radius more than twice the length of the radius of the semicircular head 4 of the sealing element 1 when in an unstressed condition. The base 10 of the profile is situated in and conforms to the groove 8, the edges of the wings 5a, 5b being substantially flush with the edges of the groove 8 when the sealing element 1 is positioned within the groove 8. When so positioned, approximately one-third of the height of the unstressed sealing element 1, as measured from the lowest point 9 of the groove 8 to the apex 11 of the head 4, protrudes above the seal carrier surface 13 outside of the groove 8.

The tapered wings 5a and 5b protrude from the base 10 of the semi-circle at an oblique angle and conform to the concave groove 8. The wings 5a and 5b initially widen with distance from the base 10 of the polymeric component's semi-circular profile until they are thickest, and then become progressively thinner until they terminate at the surface 13 of the carrier 3.

The volume of the sealing element 1 is in the range of 90% to 100% of the volume of the groove 8. When the seal is stressed during assembly of the mating element to the carrier, such that the mating surface 6 becomes flush with the grooved carrier surface 13, the groove 8 will be more than 90 percent filled by the deflected sealing element 1.

Figure 3A:
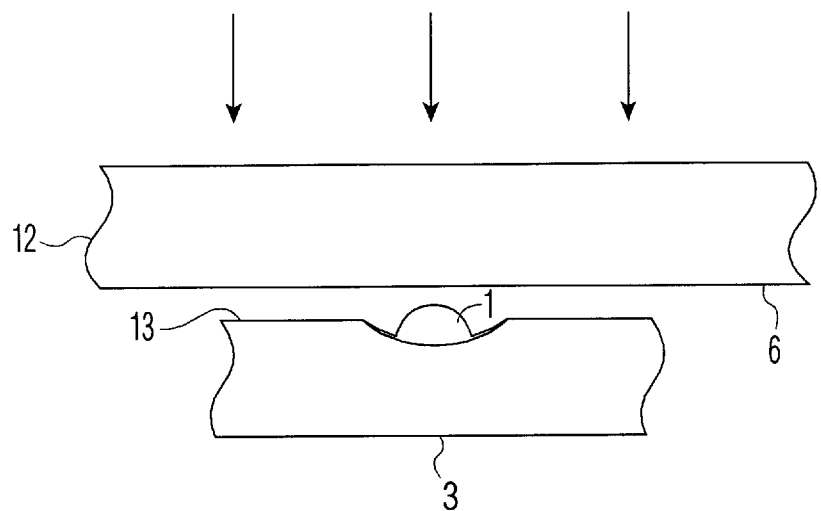
FIG. 3A illustrates a first step of a method of effecting a seal in accordance with the preferred embodiment of the invention.
Figure 3B:
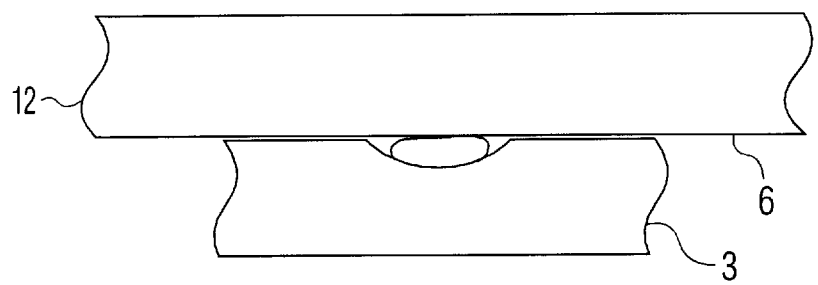
FIG. 3B illustrates a second step of the method of effecting a seal in accordance with the preferred embodiment of the invention.
Figure 3C:
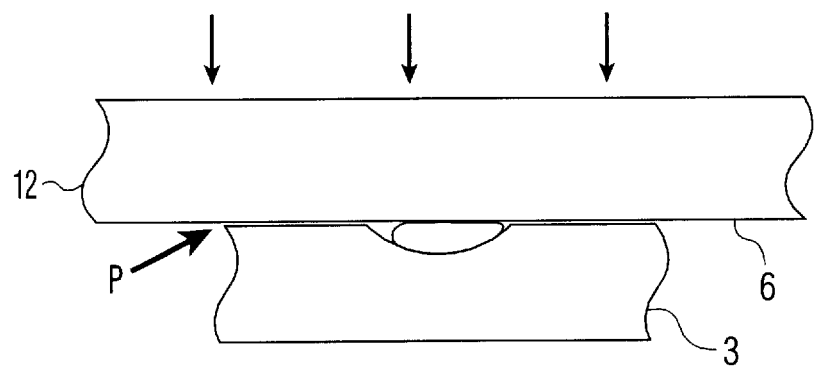
FIG. 3C illustrates a third step of the method of effecting a seal in accordance with the preferred embodiment of the invention.

Referring now to FIGS. 3A, 3B and 3C of the drawings, the application of the seal will now be described.

As shown in FIG. 3A, a seal carrier 3 is placed in proximity to a mating element 12 with the sealing element 1 opposite the region of the mating surface 6 at which the seal is intended to be effected. The carrier 3 is then moved toward the mating surface 6 thereby stressing and deforming the sealing element 1 as shown in FIG. 3B from its unstressed semicircular profile. As pressure P is applied between the juxtaposed carrier and mating surfaces, the seal is "loaded" and the profile of the sealing element 1 is shifted to the eccentric position shown in FIG. 3C.

EXAMPLE 1

A seal employing a sealing element 1 having a semicircular head 4 with a radius of 0.025 inches was placed with the convex surface of the head 4 lightly engaging a mating surface 6 on a mating element 12. The initial contact surface area between the sealing element 1 and mating surface 6 was then measured. The carrier surface 13 was then placed against the mating surface 6 by applying minimum external force to the seal carrier 3, thereby deforming the sealing element 1. The effective contact area of the sealing element 1 was observed to increase by a factor of eighteen upon deformation. The resulting seal was able to withstand pressures in excess of 1000 psi once the seal was loaded.

The seal of the invention requires simple manufacturing steps. There are two essential components that must be fabricated: 1) a carrier 3 for the seal, and 2) a sealing element 1 that acts as the seal. Manufacture of the seal carrier 3 requires that a uniform concave depression be made in which the sealing element 1 will rest. The carrier 3 can either be molded, stamped, or cut from any type of metal or other rigid material.

Manufacture of the polymeric seal requires that a suitable polymeric mixture be molded in steel tooling that will provide the desired seal component dimensions. The polymeric mixture must embody a chemical system that enables molecular cross-linking to impart physical properties that will resist compressive stress relaxation.

The polymeric seal may either rest in the seal carrier groove 8 or be fixed in the groove 8 with an adhesive system. It is necessary that the wing tips 5a and 5b of the sealing element 1 remain situated within the groove 8 when the seal of the invention is assembled into the application.

Applying a minimum mechanical load to the sealing element 1 activates the seal of the invention. Several PSI of load force are adequate to establish a seal capable of withstanding pressure differentials magnitudes greater.

The seal of the invention utilizes a polymeric material to effect the seal. Effective contact between the two surfaces is necessary to form a seal. Surface finish on the mating surfaces and the clearance between the mating surfaces requires an elastomeric material capable of deforming and recovering its initial form to maintain effective contact between the two surfaces.

Seal contact area and the resulting seal surface stress ("contact stress") from deflecting or mechanically loading the seal will determine the seal's efficacy. Normally, increasing either contact area or contact stress will increase sealing efficacy. However, constraints upon surface area or constraints upon design profiles, that could otherwise increase contact stress, have presented a problem. The seal of the invention is able to minimize contact area and maximize contact stress with a design profile that overcomes the usual constraints of design profiles known to the art. Rather than an O-ring profile (i.e. circular-section), the seal of the invention employs a semi-circular profile designed to deflect similarly to an O-ring when mechanically loaded. The seal's profile has a small radius that is impractical in an O-ring design. As the seal's profile collapses when mechanically loaded, both the contact area and contact stress increase thereby increasing the seal's efficacy. The result is an effective seal that occupies minimum surface area in the Application.

The seal of the invention requires at least 33% less sealing material than an O-ring to establish an equivalent seal. While an O-ring has a circular cross sectional profile, the profile of the seal of the invention is a small radius semicircle. This geometry allows the seal of the invention to use less material than O-rings while having an equal or greater capacity to seal.

The seal of the invention is able to develop maximum contact stress in a manner consistent with a lip seal but using a profile that is resistant to damage, easily manufactured, and easily installed in the Application.

As in the case of a lip seal, the seal of the invention forms a "flap" as its profile collapses upon itself when subjected to minimal mechanical loading. In the Application, fluid pressure exerts a force upon this "flap" thereby increasing the seal's contact stress upon the sealing surface and improving the seal's efficacy. Unlike a lip seal with its flaps and necessary profile undercuts, the seal of the invention possesses a simple convex profile that is more resistant to damage and easily manufactured. Furthermore, unlike a lip seal, the seal of the invention is capable of sealing in either direction.

The seal of the invention is resistant to damage caused by excessive mechanical loading to which a gasket, common in the prior art, is susceptible. The seal of the invention is likewise resistant to the extrusion that a gasket experiences when a pressure differential exists across it. Since the seal of the invention utilizes a concave groove in which the polymeric seal material resides, the invention's sealing profile can be collapsed until the mating surface and seal carrier contact one another thereby limiting any additional mechanical stress.

As the seal's profile collapses upon itself during mechanical loading, a rubber wing of the profile, in conjunction with the carrier's concave groove, acts as a built in back-up washer to eliminate any tendency of the seal to extrude. Since the groove clearance becomes progressively smaller towards the edge of the groove, the seal's resistance to extrusion increases as the applied pressure increases. Furthermore, since the groove possesses a concave profile, there is no sharp groove angle, otherwise common in the art, which can present a fracture site as the seal attempts to extrude.

It is to be appreciated that the foregoing is a description of a preferred embodiment of the invention to which variations and modifications may be made without departing from the spirit and scope of the invention.

What is claimed is:

1. A sealing element for preventing leakage of fluid under pressure between a carrier and a mating element adapted to engage said carrier, said sealing element being formed from a material resistant to compressive stress relaxation and comprising a head having a cross section of generally semicircular circumference, an arcuate segment of said head portion circumference being engageable by said mating element as said mating element approaches said carrier, and a base to which said head is integrally connected, said base being adapted for seating within a groove in said carrier, said base comprising first and second integral wings extending outwardly in mutually opposite directions, whereby mechanical pressure applied against said arcuate segment of said sealing element by said mating element deforms said sealing element for increasing the contact surface area between said sealing element and said mating element, and pressure exerted by said fluid urges said head against at least one of said wings, for preventing passage of fluid between said sealing element and said carrier.

2. A sealing element in accordance with claim 1 wherein at least one of said wings has a profile narrower at a free end distal from said head than at an opposite end proximate a juncture between said head and said base.

3. A sealing element in accordance with claim 2 wherein said wing profile initially widens with distance from said juncture between said head and said base toward an intermediate region of maximum thickness and then tapers for becoming progressively thinner from said region of maximum thickness to said free end.

4. A sealing element in accordance with claim 1 comprising a polymer which renders said sealing element elastomeric and deformable but substantially incompressible.

5. A seal for preventing leakage of a fluid, comprising an elastomeric sealing element formed from a material resistant to compressive stress relaxation and comprising a head having a cross section of generally semicircular circumference, an arcuate segment of said head portion circumference engageable by a mating element, and a base to which said head is integrally connected, said base comprising first and second integral wings extending outwardly in mutually opposite directions, a carrier having a surface in which there is a circular groove, the base of said sealing element engaging a floor of said groove and the head of said sealing element extending from said base beyond said carrier surface, and each of said wings having an outer edge extending toward a respective edge of said groove, whereby the surface of said mating element, when brought into engagement with said carrier surface, engages and deforms said sealing element for increasing the contact surface area between said sealing element and said mating element, and pressure exerted by said fluid urges said head against at least one of said wings, for preventing passage of fluid between said sealing element and said carrier.

6. A seal in accordance with claim 5 wherein the radius of the groove in the surface of the carrier is at least twice as great as the radius of the head of the sealing element.

7. A seal in accordance with claim 5 wherein one third of the height of the sealing element extends outside of the groove in the carrier.

8. A seal in accordance with claim 5 wherein at least one of said wings has a profile narrower at a free end distal from said head and proximate an edge of said groove than at an opposite end proximate a juncture between said head and said base.

9. A seal in accordance with claim 8 wherein said wing profile initially widens with distance from said juncture between said head and said base toward an intermediate region of maximum thickness and then tapers for becoming progressively thinner from said region of maximum thickness to said free end adjacent said edge of said groove.

10. A seal in accordance with claim 5 wherein the volume of said sealing element exceeds 90 percent of the volume of said groove.

11. A seal in accordance with claim 5 further comprising an adhesive disposed between said sealing element and said carrier within said groove for adhering said sealing element to said carrier.

12. A seal in accordance with claim 5 wherein the edges of said sealing element wings are within said groove.

13. A method for preventing fluid from traversing an interface between a surface of a carrier element and a surface of a mating element in a flow direction leading from a pressure source to a pressure sink, comprising forming a concave groove in the carrier element, said groove running in a direction transverse to said flow direction, inserting within said groove, an elastomeric sealing element formed from a material resistant to compressive stress relaxation and having a base with a central portion, first and second wings extending outwardly from said base central portion in opposite directions, and a head extending upwardly from said base central portion beyond said carrier surface and having, when unstressed, a convex outer surface, a bottom surface of said base substantially covering the entire surface of said carrier within said groove, placing said mating element surface in engagement with said carrier surface and with the convex outer surface of said sealing element whereby said sealing element is deformed to assume a profile which presents an impenetrable barrier to the flow of said fluid from said source to said sink.

\* \* \* \* \*